United States Patent [19]
King et al.

[11] Patent Number: 5,713,336
[45] Date of Patent: Feb. 3, 1998

[54] METHOD AND APPARATUS FOR PROVIDING MULTIPOINT GASEOUS FUEL INJECTION TO AN INTERNAL COMBUSTION ENGINE

[75] Inventors: Steven R. King; Michael W. Walser, both of Burleson; Christopher M. Cole, Fort Worth; John W. Carpenter, Arlington, all of Tex.

[73] Assignee: Woodward Governor Company, Loveland, Colo.

[21] Appl. No.: 378,125

[22] Filed: Jan. 24, 1995

[51] Int. Cl.⁶ ............................................. F02M 21/02
[52] U.S. Cl. ...................................... 123/525; 123/575
[58] Field of Search ........................... 123/525–529, 123/27 GE, 575

[56] References Cited

U.S. PATENT DOCUMENTS

| | | | |
|---|---|---|---|
| 2,833,260 | 5/1958 | Dolza et al. | 123/471 |
| 5,163,406 | 11/1992 | Daly et al. | 123/468 |
| 5,228,423 | 7/1993 | Oikawa et al. | 123/525 |
| 5,237,981 | 8/1993 | Polletta et al. | 123/527 |
| 5,377,645 | 1/1995 | Moore | 123/525 |
| 5,408,978 | 4/1995 | Davis | 123/527 |
| 5,465,699 | 11/1995 | Voigt | 123/470 |
| 5,526,797 | 6/1996 | Stokes | 123/525 |
| 5,533,485 | 7/1996 | Bronkal | 123/468 |
| 5,549,083 | 8/1996 | Feiling | 123/525 |

FOREIGN PATENT DOCUMENTS

| | | | |
|---|---|---|---|
| 8303120 | 9/1983 | WIPO | F02D 19/02 |
| 8301486 | 4/1996 | WIPO | F02D 19/08 |

OTHER PUBLICATIONS

European Patent Office Search Report, Patent Application Number EP96300436 dated Jun. 13, 1996.

*Primary Examiner*—Erick R. Solis
*Attorney, Agent, or Firm*—Leydit, Voit & Mayer, Ltd.

[57] ABSTRACT

A multipoint fuel delivery system for an internal combustion engine includes fuel metering device(s) such as fuel injector(s) associated for selectively controlled injection of the second fuel to corresponding combustion chamber(s) of the internal combustion engine. A fuel supply manifold associates with fuel injector(s) for directing the second fuel to each fuel injector. An intake port adaptor mechanism adapts the intake port of the associated combustion chamber to receive the selectively controlled injection of the fuel from an associated fuel injector. The intake port adaptor mechanism may also engage the intake port so as to permit selective flow of the first fuel or the second fuel to the intake port of the selected combustion chamber. A control mechanism selectively controls the flow of the second fuel through each injector(s). The multipoint fuel delivery system make practical both dedicated or single-fuel multipoint injection and, alternatively, selective bi-fuel multipoint injection for an internal combustion engine.

14 Claims, 6 Drawing Sheets

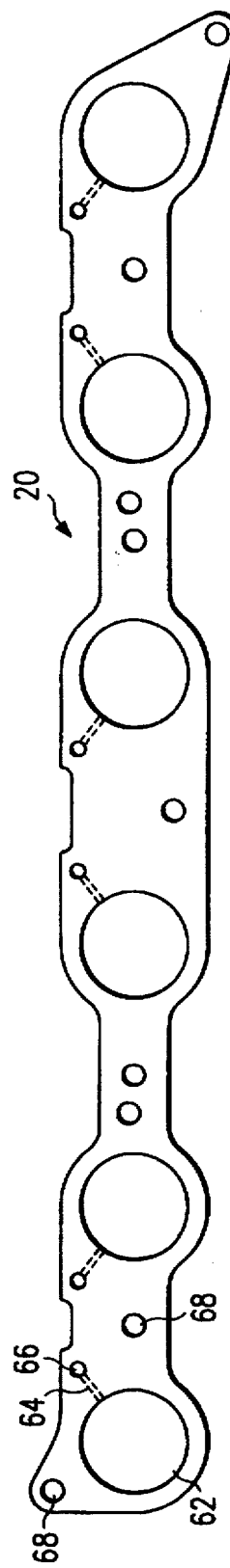
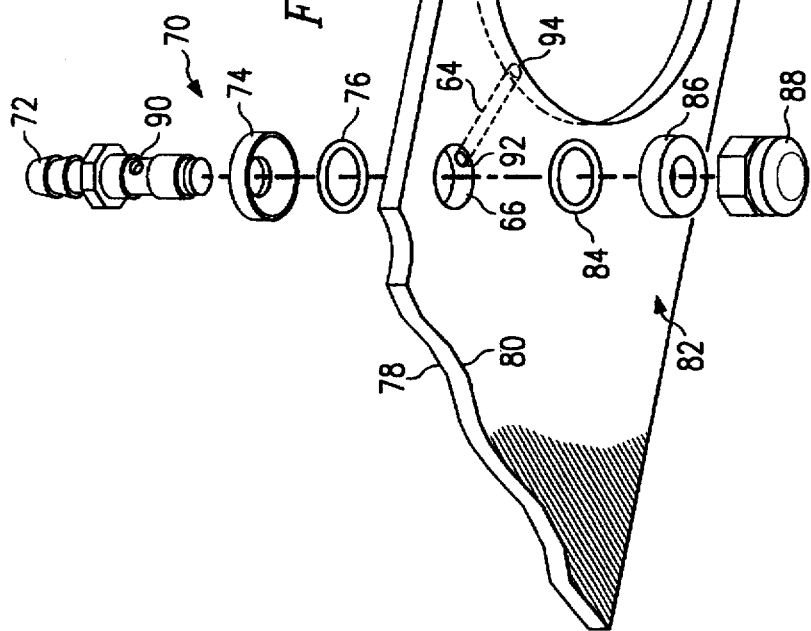
FIG. 4A
FIG. 4B

METHOD AND APPARATUS FOR PROVIDING MULTIPOINT GASEOUS FUEL INJECTION TO AN INTERNAL COMBUSTION ENGINE

TECHNICAL FIELD OF THE INVENTION

The present invention relates generally to automotive engine technology and, more particularly, to a multipoint gaseous fuel injection system that provides gaseous fuel to an internal combustion engine by selectively metering the gaseous fuel directly to individual intake ports of the internal combustion engine combustion chambers.

BACKGROUND OF THE INVENTION

Currently, the most accepted method of metering fuel to internal combustion engines is through the use of pulse-width-modulated (PWM) solenoid valves referred to as fuel injectors. For these engines, a microprocessor provides control signals of the proper timing and duration for proper fuel delivery by the fuel injectors. For conventional engines that use liquid fuels, such as gasoline, fuel injectors are oriented with one end protruding into an intake port near the combustion chamber intake valve. The other fuel injector end receives fuel from a manifolding device. This placement of injectors, one per intake port, is commonly referred to as multipoint injection.

Multipoint fuel injection of alternative fuels is a highly attractive method of metering fuel. Multipoint fuel injection, for example, permits much more precise control of fuel flow than do single point or conventional introduction systems. This is particularly important for gaseous fuel engines. Conventional multipoint fuel injection systems, however, do not easily permit either dedicated multipoint alternative fuel injection or bi-fuel multipoint system operation. Most existing alternative fuel systems for gaseous fuels in internal combustion engines introduce fuel upstream of the intake manifold. The intake manifolds that these engines possess, however, are too large to permit precise engine control using single point injection upstream of the manifold. With these engines, time lags occur in engine response and large fueling errors arise during transient engine operations. These engines, for example, often have limited space to accommodate multipoint injection hardware. Also, the costs to convert the existing intake manifold for multipoint injection may make alternative multipoint fuel injection impractical. These costs include, for example, tooling, machining, and labor costs for performing complicated installation and modification procedures for converting a conventional fuel engine to either a dedicated multipoint engine or a bi-fuel multipoint engine.

Other problems with conventional throttle-body alternative fuel systems adapted to internal combustion engines relate to the fact that their intake manifold has a larger volume than does the engine displacement volume. Because of these large manifolds, throttle-body (single point) gaseous fuel injection systems adapted these engines with large intake manifolds (1) inaccurately meter fuel; (2) have less than desirable driveability; and (3) produce higher than desirable emissions.

SUMMARY OF THE INVENTION

Therefore, a need has arisen for a commercially practical fuel system that allows dedicated multipoint injection of alternative fuels as well as bi-fuel engine operation capability on gasoline or conventional engines. As used herein, dedicated multipoint fuel injection means that the only source of fuel to the engine is through a dedicated multipoint fuel delivery system. In bi-fuel multipoint fuel injection, an operator may select to use either a conventional fuel, such as gasoline, or an alternative fuel, such as a gaseous fuel.

There is a need for a multipoint injection system for alternative fuel conversions that does not require significant modifications to existing internal combustion engine hardware.

There is a further need for a multipoint injection fuel system for internal combustion engines that provides more accurate fuel metering, improved driveability, and the potential for lower emissions when compared to throttle body or pre-mixed fuel injection systems.

Still, a further need exists for a multipoint gaseous fuel injection system that may be used to provide fuel to virtually any type of internal combustion engine. For example, there is the need for a multipoint fuel injection system that may be used with engines with space constraints or for which intake manifold modifications may be cost prohibitive.

In accordance with the present invention, therefore, a method and system for multipoint gaseous fuel injection to an internal combustion engine is provided that substantially eliminates or reduces disadvantages and problems associated with previously developed multipoint fuel injection systems. The present invention overcomes or substantially reduces the problems of engines that introduce fuel upstream of the intake manifold and permits easy conversion of a multipoint gasoline engine to either a dedicated gaseous-fuel engine or a bi-fuel multipoint gasoline/gaseous-fuel engine.

More specifically, the present invention provides a method and system for multipoint alternative fuel injection to an internal combustion engine. The present invention provides not only dedicated or single fuel multipoint injection to such an engine, but also a bi-fuel engine that uses both a conventional fuel such as gasoline and a second or alternative fuel such as a gaseous fuel. For an engine including at least one combustion chamber, where each combustion chamber includes an associated intake port, the present invention includes at least one fuel metering device, such as a fuel injector, such that each fuel injector is associated for selectively controlled injection of the fuel to the engine combustion chambers. A fuel supply manifold may be, for example, a fuel supply block that holds one or more fuel injectors that are at a location that is remote from the engine or a fuel supply rail that supplies fuel injectors that attach to the engine. The fuel supply block associates with the fuel injectors to form a fuel metering valve assembly. The fuel supply manifold associates with each fuel injector for directing the fuel from a central location such as a gaseous fuel supply line to each of the fuel injectors. An intake port adapter mechanism, such as a mixer plate or injector adapter, adapts the intake port of each combustion chamber to receive the selectively controlled injection of the fuel from the fuel injectors. The intake port adapter mechanism engages the intake port for permitting flow of the fuel to the intake port of the selected combustion chamber. A control mechanism selectively controls the flow of the fuel through each of the at least one injector to each of the selected or associated intake ports.

Technical advantages of the invention are that it provides an easy to use and practical method and system that includes the features of improved tip-in driveability, more accurate fuel control, reduced exhaust emissions, and reduced start times for gaseous fuel internal combustion engines.

Another technical advantage of the present invention is that it provides an improved multipoint gaseous fuel injection system that permits locating fuel injectors in a common location for supplying fuel by a common fuel supply line and that further plumbs each fuel injector to an associated intake port and combustion chamber on the engine. The present invention provides a practical mechanism for direct and controlled multipoint fuel injection of an alternative fuel together with the associated desirable engine performance characteristics of this form of fuel injection.

Another technical advantage of the present invention is that it provides a method to convert an internal combustion engine to a multipoint fuel control strategy with minimal modification to the engine. In fact, the present invention provides in at least one embodiment a bolt-on multipoint control system that may be applied to a wide variety of internal combustion engines.

Another technical advantage of the present invention is that it provides a method of operation whereby a fuel metering device may be placed remote to the engine with all injectors and sensors in one package or unit and with each injector having an individual tube that routes the fuel to a mixer plate or injector adapter that is mounted to or associated with the intake port for the engine combustion chambers. This makes it practical to use the multipoint control system of the present invention with engines having space limitations and cost constraints.

There are other practical embodiments on the invention as described more particularly in the following detailed description.

BRIEF DESCRIPTION OF THE DRAWINGS

For a more complete understanding of the present invention and the advantages thereof, reference is now made to the following description which is to be taken in conjunction with the accompanying drawings in which like reference numerals indicate like features and wherein:

FIGS. 4a and 4b show a mixer plate according to one aspect of the present invention and a banjo-type fitting for transfer of the fuel to the mixer plate, respectively;

DETAILED DESCRIPTION OF THE INVENTION

Illustrative embodiments of the present invention are illustrated in the FIGURES, like numerals being used to refer to like and corresponding parts of the various drawings.

Figure 1:
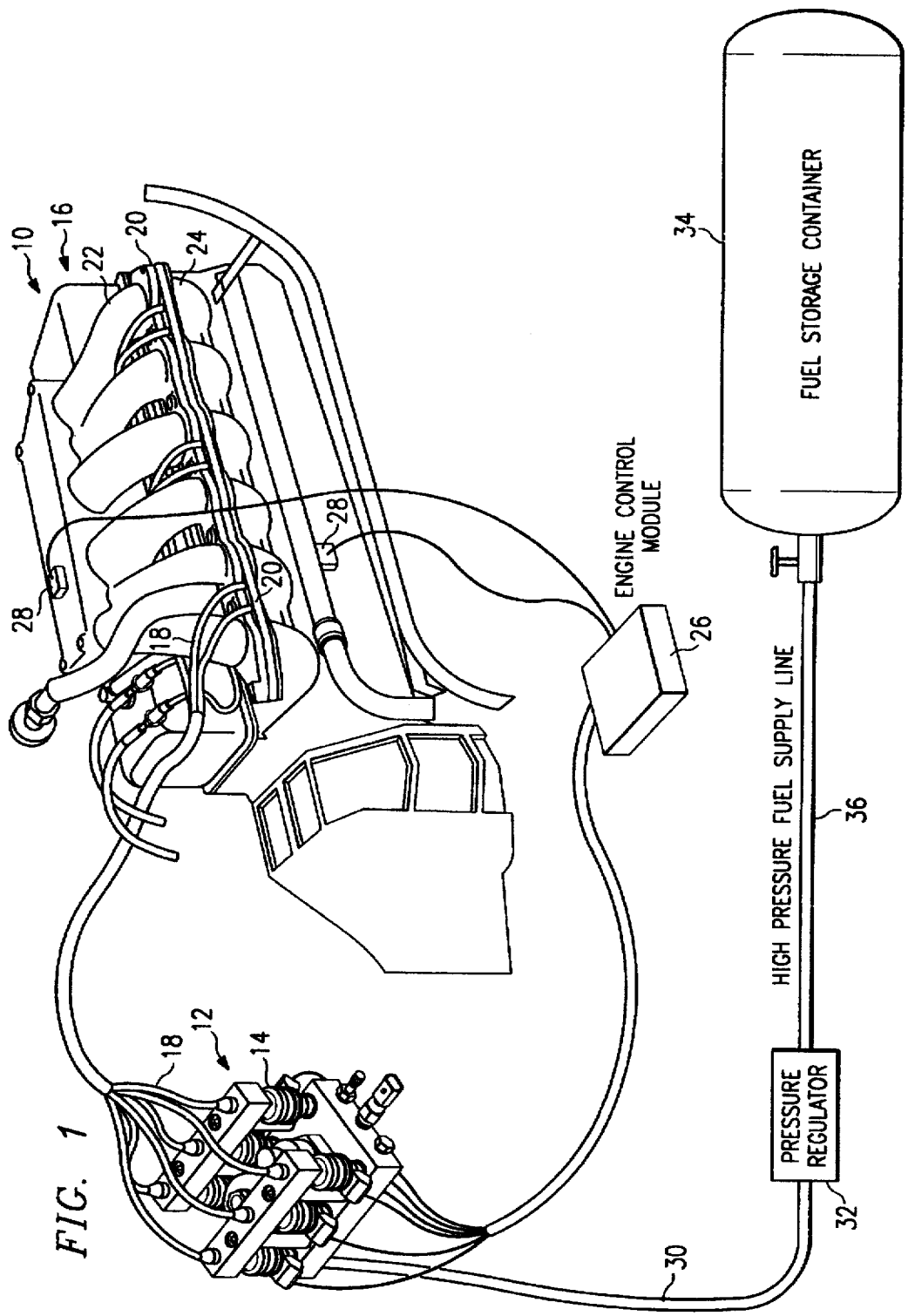
FIG. 1 illustrates an internal combustion engine system employing one embodiment of the present invention.

FIG. 1 shows multipoint gaseous fuel delivery system 10 that, in the illustrated embodiment, includes fuel metering valve assembly 12. Fuel metering valve assembly 12 includes a number of fuel metering valves, such as fuel injectors 14, that inject a fuel into individual cylinders or combustion chambers of engine 16. Output from each fuel injector 14 passes through delivery tube 18 to mixer plate 20. Mixer plate 20 is positioned, for example, in the engine 16 intake manifold between manifold upper section 22 and manifold lower section 24 and provides a separate path of fuel from each fuel injector to each combustion chamber of engine 16. Engine control module (ECM) 26 receives numerous pressure, temperature and other operating signals from sensors 28 that sense operating parameters of engine 16. ECM 26 processes these signals and, in response to the processed signals, directs the operation of each fuel injector 14.

Fuel metering valve assembly 12 receives from pressurized fuel line 30 a pressurized fuel from pressure regulator 32. Pressure regulator 32 receives gaseous fuel from fuel storage container 34 via high pressure fuel supply line 36.

Engine 16 may be a positive displacement or rotary engine having at least one cylinder or combustion chamber. Placement of mixer plate 20 depends on the many possible embodiments of the present invention. For example, mixer plate 20 may be placed between the intake manifold of engine 16 and the intake ports to each combustion chamber of engine 16. As defined herein, each intake port is that portion of the manifold that directs intake air and fuel is separated into one separate path per combustion chamber. Alternatively, mixer plate 20 may be placed in the air/fuel path between the engine head and the intake manifold. Essentially any place that can accommodate the size of mixer plate and that permits the selective introduction of fuel from fuel injectors 14 to the engine 16 combustion chambers is a practical position for mixer plate 20 and clearly within the scope of the present invention.

Although numerous devices may serve the function of ECM 26 to establish a microprocessor-based control system, one system adaptable to the system of the present embodiment is Part No. 1707004 that is manufactured by Mesa Environmental Ventures, Co., of Fort Worth, Tex. ECM 26 may control the operation of fuel injectors 14 according to a predetermined control strategy. The optimal control strategy may vary for a particular engine and can be determined using test methodology familiar to engine development engineers of ordinary skill in the art. Another controller for controlling the performance of fuel injectors 14 may be through the use of the onboard engine controller for a gasoline engine that is modified to control operation of the fuel injectors 14. ECM 26 may also include a harness, sensors and other components to provide microprocessor-based control of fuel metering valve assembly 12. In FIG. 1, fuel storage container 34 may be a compressed or liquid natural gas cylinder, an liquid propane gas tank, or other form of fuel storage tank for gaseous fuels, where the term "gaseous fuel" means a fuel that is in a gaseous state under normal ambient conditions.

Figure 2:
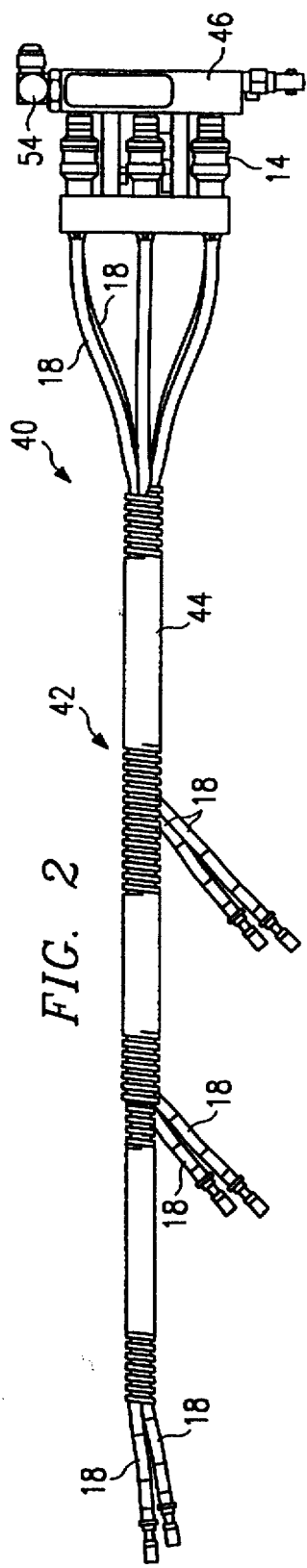
FIG. 2 illustrates the fuel metering valve assembly and delivery hose assembly according to one embodiment of the invention.

FIG. 2 illustrates fuel delivery assembly 40 of one embodiment of the invention. Fuel delivery assembly 40 includes fuel metering valve assembly 12 and fuel delivery hose assembly 42. Fuel delivery hose assembly 42 protects the individual fuel delivery hoses 18 that go to the combustion chambers of engine 16. In the embodiment of FIG. 2, fuel delivery hose assembly 42 is bundled using a corrugated loom 44 that is flexible and that protects each individual fuel delivery hose 18. This form of fuel bundled assembly 42, however, is optional.

Figure 3:
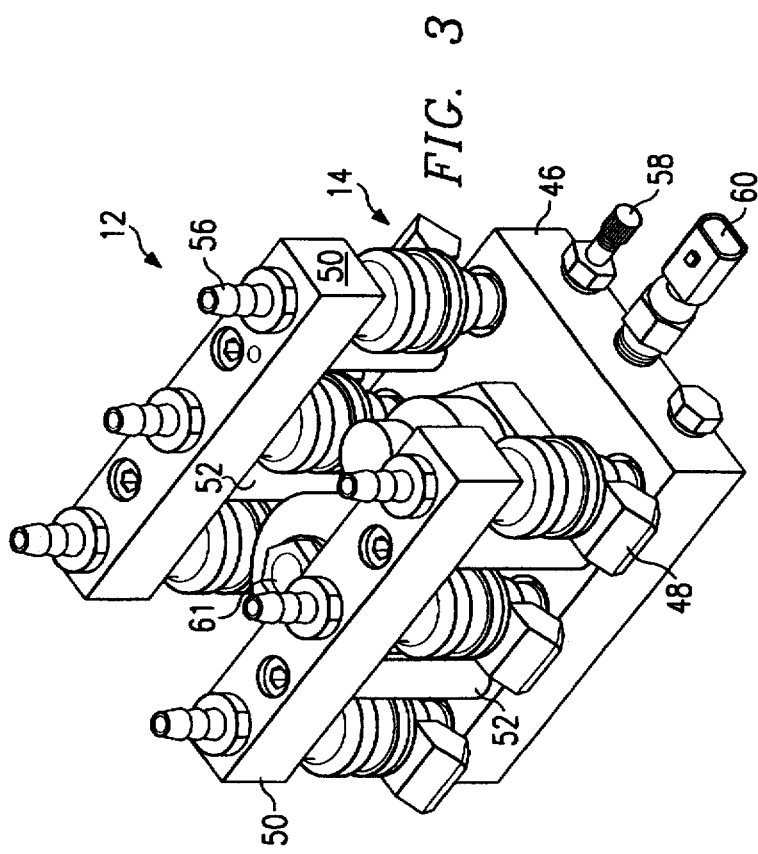
FIG. 3 shows an isometric view of one embodiment of the fuel metering valve assembly of the present invention.

FIG. 3 shows in more detail fuel metering valve assembly 12 that includes fuel supply block 46 to which each individual fuel injector 14 attaches. Each individual fuel injector 14 includes a connection 48 to ECM 26. Cross bars 50 and connecting shafts 52 hold each fuel injector 14 securely to fuel supply block 46. Referring now to both FIGS. 2 and 3, fuel supply block 46 receives fuel at connection 54 and distributes gaseous fuel to each fuel injector 14. In the preferred embodiment, each fuel injector 14 is solenoid-operated and outputs to hose connection 56 which also attaches to a cross bar 50. Fuel supply block 46 may also optionally include temperature sensor 58, pressure sensor 60, and fuel shut-off valve 61.

FIGS. 4a and 4b show views of mixer plate 20 of the present embodiment. Mixer plate 20 is formed to permit its placement between manifold upper section 22 and the manifold lower portion 24 of each combustion chamber of engine 16 (see FIG. 1). In the embodiment of FIGS. 4a and 4b, mixer plate 20 is configured for a six-cylinder internal combustion engine 16. That is, mixer plate 20 includes six intake openings 62, each having a diameter equivalent to the diameter of the intake port for the associated combustion chamber of engine 16. Intake opening 62 also connects, via a cross passage, such as cross passage 64, to through-hole 66. For secure placement of mixer plate 20 between manifold upper section 22 and manifold lower portion 24 of engine 16, screwholes 68 align to existing screwholes that bolt manifold upper portion 22 to manifold lower portion 24. Mixer plate 20 has a thickness of approximately one-quarter inch, in the embodiment of FIGS. 4a and 4b, and may be made of an aluminum material.

FIG. 4b illustrates a banjo-type fitting 70 that the present embodiment uses in conjunction with mixer plate 20. Banjo-type fitting 70 includes fuel delivery hose connector 72 that receives fuel delivery hose 18 and around which bevelled washer 74 fits. O-ring 76 fits within bevelled washer 74 and maintains an airtight seal with the top surface 78 of mixer plate 20 and connector 72. Along bottom surface 80 of mixer plate 20 and opposite banjo-type hose connector 72 is securing mechanism 82. Securing mechanism 82 includes O-ring 84 that maintains an airtight seal between bottom surface 80 and delivery hose connector 72. Nut 88 holds hose connector 72 and securing mechanism 82 firmly in place within mixer plate 20.

In operation of banjo-type fitting 70, gaseous fuel flows from fuel delivery hose 18 (FIGS. 1 and 2), through banjo-type fitting 72 and out passageway 90. When banjo-type fitting 70 is placed within through-hole 66, the second or alternative fuel, which is preferably a gaseous fuel, passes into the opening established by the fitting of beveled washers 74 and 86 and tightly sealed by O-ring 76 and 84. Fuel then passes into cross-passage opening 92. As FIG. 4 illustrates, from cross-passage opening 92 gaseous fuel passes to outlet 94 and then to associated intake opening 62 and into the manifold lower portion 24 of engine 16.

The introduction point for the second fuel that the present invention provides is at an optimal point relative to manifold dynamics. Each one of the fuel injectors 14 may respond to a separate sensed signal associated with its respective combustion chamber and may provide more or less flow of the second fuel based on that particular combustion chamber's power demand. As opposed to injecting the fuel into the engine intake manifold and then distributing the fuel to all combustion chambers, the present embodiment injects the fuel directly into the intake port of an associated combustion chamber. By selectively injecting fuel into an associated manifold lower portion 24, the present embodiment more precisely delivers the alternative fuel to the engine. The result is a more responsive engine that is capable of improved driveability, less hesitation, and better emission control when compared to other types of engines that introduce fuel upstream of the intake manifold. In addition, placing the fuel supply at manifold lower portion 24 makes it possible for the engine to receive, alternatively, gasoline fuel or a gaseous fuel, such as compressed or liquid natural gas or liquid propane gas fuel. The result is either a mono-fuel engine with a dedicated multipoint fuel injection system or a bi-fuel engine with the selective capability of using two different types of fuel at least one of which is provided via multipoint injection.

Figure 5:
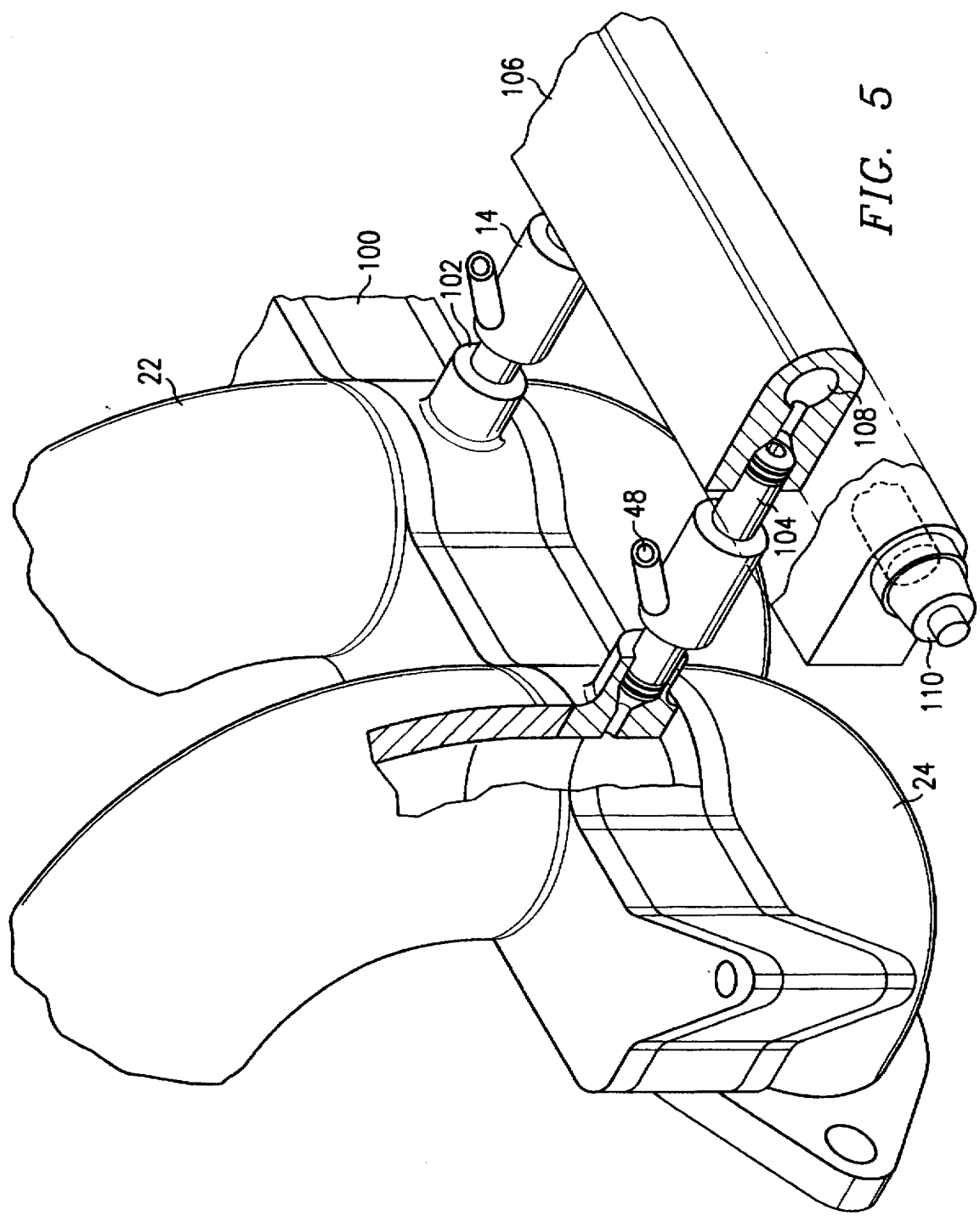
FIG. 5 illustrates an alternative embodiment of the invention employing a manifolding device for distributing fuel to alternative fuel injectors.

FIG. 5 illustrates an alternative embodiment of the invention that includes mixer plate 100 for positioning between manifold upper section 22 and manifold lower portion 24. Mixer plate 100 includes fitting 102 into which gaseous fuel injector 14 connects. Instead of fitting 102, a boss or other mechanism for introducing fuel into mixer plate 100 may be used. Fuel injector 14 includes connection 48 to ECM 26 (see FIG. 1). Fuel to gaseous fuel injector 14 comes through connection 104 of fuel supply rail 106. Fuel supply rail 106 receives gaseous fuel directly from pressure regulator 32 and contains pressurized gaseous fuel in fuel supply passage 108. Pressure sensor 110 may detect and generate a signal indicating the pressure in fuel supply passage 108. Also, temperature sensor 111 may detect and generate a signal indicating the temperature in fuel supply passage 108.

Figure 6A:
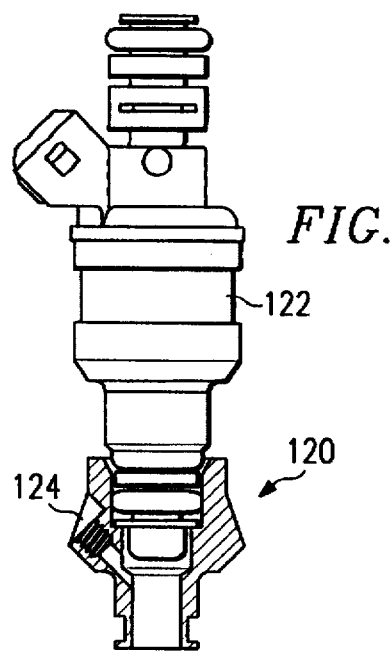
FIGS. 6a through 6c illustrate alternative embodiments of the present invention in the form of injector adapters for use on the intake port of a multipoint engine and its associated combustion chamber.
Figure 6B:
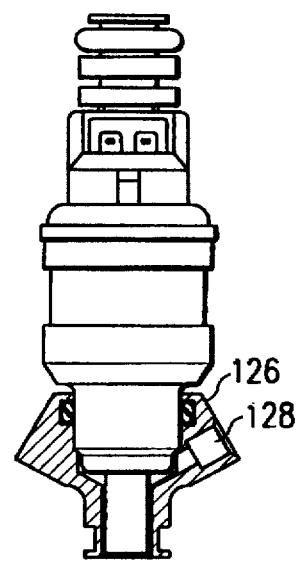
Figure 6C:
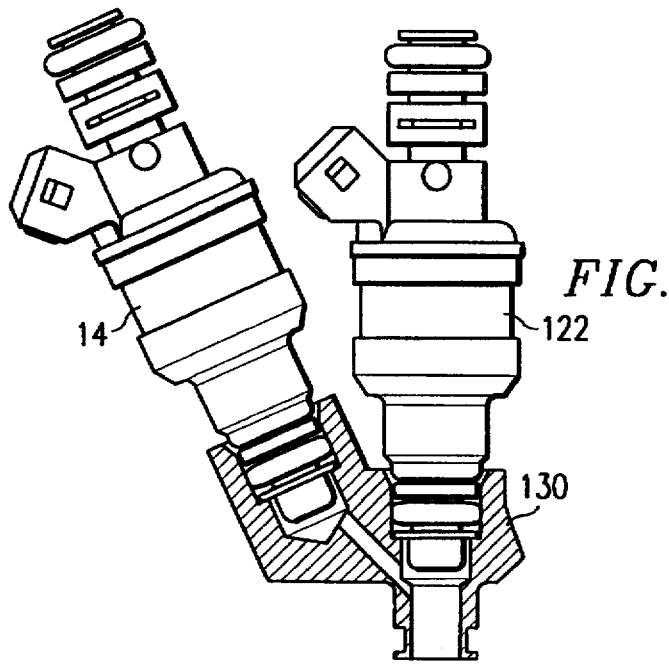

FIGS. 6a through 6c illustrate further alternative embodiments of the present invention. In particular, FIG. 6a shows injector adapter 120 to which gasoline fuel injector 122 attaches for delivering the liquid gasoline fuel. Adapter 120 includes input 124 for receiving gas from an alternative fuel metering device such as fuel injector 14 of FIG. 1. Adapter 120 substitutes for and eliminates the need for mixer plate 20. FIG. 6b shows an alternative embodiment of the injector adapter 120 of FIG. 6a as injector adapter 126 that locates gasoline fuel injector 122 in its original position relative to the intake manifold. In other words, while injector adapter 120 of FIG. 6a slightly elevates gasoline fuel injector 122, injector adapter 126 of FIG. 6b maintains constant the position of gasoline fuel injector 122 for engines that require such a design. Injector adapter 126 also includes gaseous fuel input 128.

FIG. 6c shows a further embodiment in the form of injector adapter 130 that may receive in combination gasoline fuel injector 122 and natural gas fuel injector 14, both as previously described. Injector adapter 130 further eliminates the need for metering device tube assembly 40 and the associated metering device tube 18. For injector adapter 130, the second fuel flows directly from fuel injector 14 to adapter output 132 via gaseous fuel input 134. Fuel supply rail 106 provides gaseous fuel to gaseous fuel injector 14. Another embodiment of injector adapter 130 that includes the feature of maintaining constant the position of gasoline fuel injector 122 relative to the intake manifold (similar to the feature of injector adapter 126 of FIG. 6b) is also within the scope of the present invention.

Figure 7:
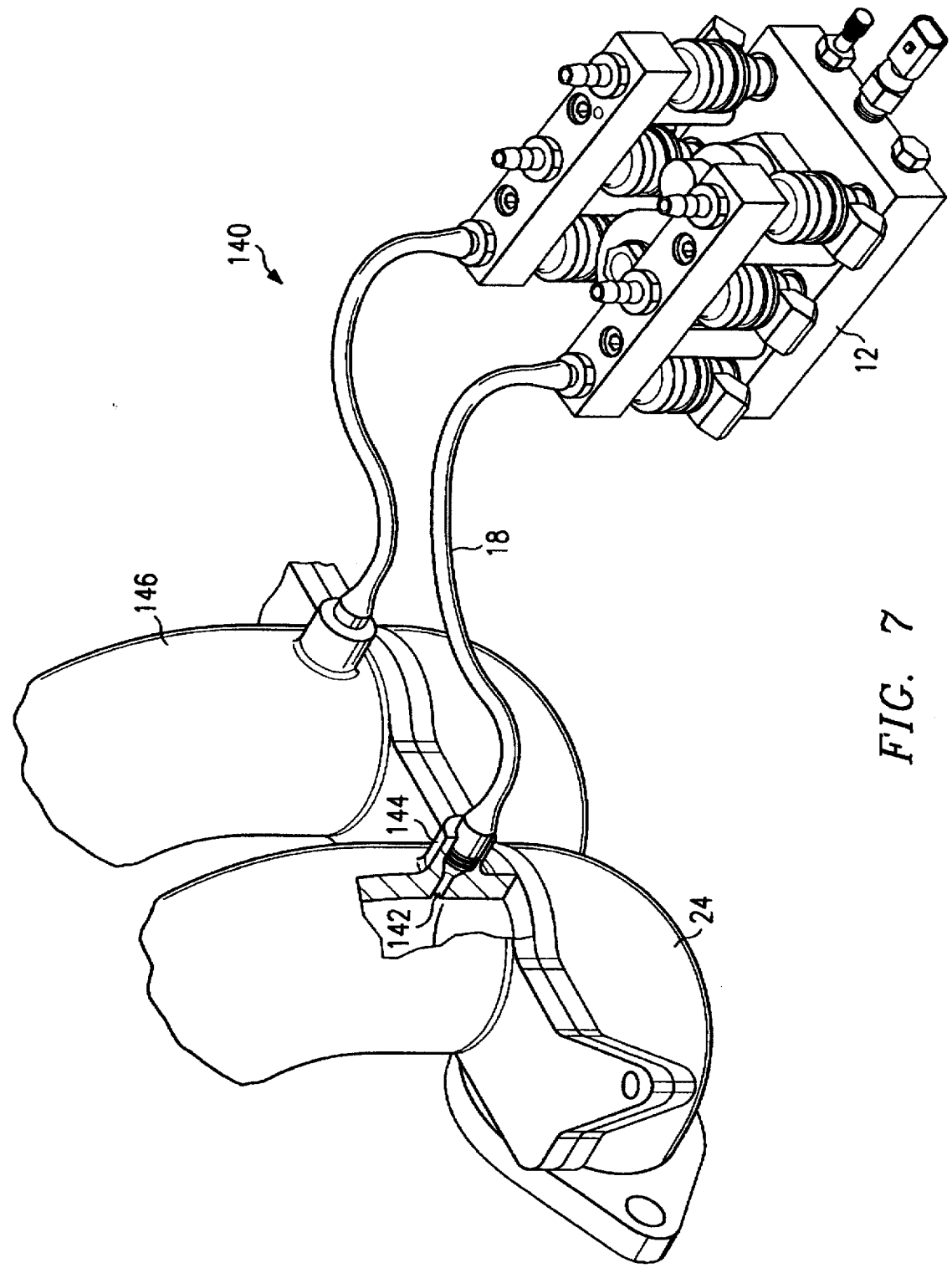
FIG. 7 shows yet a further alternative embodiment of the invention in the form of an injector nozzle applied to an internal combustion engine intake runner.

FIG. 7 illustrates a further alternative embodiment 140 of the multipoint gaseous fuel delivery system of the present invention. In particular, from fuel metering valve assembly 12, fuel delivery tube 18 connects to injector nozzle 142. Injector nozzle 142 fits within a formed hole or penetration 144 of intake manifold 146. From injector nozzle 142 the fuel enters intake manifold 146 through passage 143 and passes directly into engine 16. This embodiment may be desirable to overcome space limitations near engine 16 and where it is practical to remotely use fuel metering valve assembly 12.

OPERATION

In operation and with reference to FIGS. 1 through 4, multipoint fuel delivery system 10 provides an alternative or second fuel to internal combustion engine 16 for improved control in both steady state and transient operations. To more fully understand the operation of alternative fuel delivery system 10, consider the instance of steady state engine operation. Engine pressure and temperature signals, as well as other engine control signal inputs, go to ECM 26 for the generation of control signals to each of fuel injectors 14 on fuel metering valve assembly 12. Based on control signals from ECM 26, one or more of fuel injectors 14 will open to send fuel from line 30 through a respective fuel delivery tube 18.

As fuel enters tube 18, it passes to mixer plate 20 where, using banjo-type fitting 70, fuel passes into through-hole 66 and into cross passage 64. From cross passage 64, fuel passes to intake opening 62. From intake opening 62, the alternative fuel goes directly into the respective manifold lower portion 24 and into the engine combustion chamber. This provides the necessary fuel to respond to the engine 16 demand for the respective combustion chamber. This combustion chamber output directly affects the pressure temperature and other sensed parameters that go to engine control module 26. In response, engine control module 26 will send adjusted signals to each of fuel injectors 14 on fuel metering valve assembly 12. The other embodiments described in FIGS. 5 through 7 operate in an essentially similar manner. The result, irrespective of the embodiment, is a more responsive internal combustion engine with multipoint injection capability.

The direct benefits of the present embodiment include improved driveability, improved tip-in response, and reduced emissions relative to throttle body and other forms of alternative fuel injection. This is due to the more immediate and direct control that the present embodiment provides.

Although the invention has been described with reference to the above-specified embodiments, this description is not meant to be construed in a limiting sense, various modifications of a disclosed embodiment, as well as alternative embodiments of the invention will become apparent to persons skilled in the art upon reference to the above description. It is therefore, contemplated that the appended claims will cover such modifications that fall within the true scope of the invention.

What is claimed is:

1. A multipoint bi-fuel engine capable of using a first fuel and a second fuel, comprising:
    an engine capable of using the first fuel and comprising at least one combustion chamber, each combustion chamber having an intake port;
    at least one fuel metering device for selectively controlled injection of the second fuel to a corresponding one of the at least one combustion chamber;
    a fuel supply manifold associated with said at least one fuel metering device for directing the second fuel to each of said at least one fuel metering device;
    an intake port adapter mechanism for adapting the intake port of a selected one of said at least one combustion chamber to receive the selectively controlled injection of the second fuel from a selected one of said at least one fuel metering device, said intake port adapter mechanism engaging the intake port for selectively flowing the second fuel to the intake port of the selected combustion chamber;
    at least one fuel supply hose each said hose having a first end coupled to one of said at least one fuel metering device and having a second end coupled to said intake port adapter mechanism; and
    a control mechanism for selectively controlling the flow of the second fuel through each of said at least one fuel metering device.

2. The multipoint bi-fuel engine of claim 1, further comprising a fuel metering valve assembly having a fuel supply block associating with each of said at least one fuel metering device, said fuel metering valve assembly for receiving the second fuel and distributing the second fuel to said selectively controlled at least one fuel metering device.

3. The multipoint bi-fuel engine of claim 1, wherein said intake port adapter mechanism comprises mixer plate, said mixer plate comprising at least one fuel receiving mechanism and at least one intake port opening, each of said at least one fuel receiving mechanism and said intake port opening associated with a selected one of said at least one combustion chamber and comprising a cross-passage connecting to a selected one of said at least one intake port opening.

4. The multipoint alternative bi-fuel engine of claim 1, wherein said intake port adapter mechanism comprises a mixer plate, said mixer plate comprising at least one fuel receiving mechanism and at least one intake port opening, each of said at least one fuel receiving mechanism and said intake port opening associated with a selected one of said at least one combustion chambers and comprising a cross-passage connecting to a selected one of said at least one intake port opening, and further wherein each of said at least one fuel receiving mechanism receives and directs the second fuel from said selected injector to a selected intake port.

5. A multipoint fuel injection method for introducing an alternative fuel into an internal combustion engine designed to operate with a conventional fuel, the engine having a plurality of combustion chambers, each combustion chamber having an intake port, the method comprising the steps of:
    selectively controlling the injection of the alternative fuel from at least one injector associated with a corresponding one of at least one associated intake port;
    directing the alternative fuel to each of said at least one injector using a fuel supply manifold associated with said at least one injector;
    receiving the selectively controlled injection of the alternative fuel from a selected one of said at least one injectors using a fuel supply hose having a first end coupled to the injector and a second end coupled to an intake port adapter mechanism that adapts the intake port of a selected one of said at least one combustion chamber by engaging the intake port with said intake port adapter mechanism so as to permit selective flow of the alternative fuel to the intake port of the selected combustion chamber; and
    selectively controlling the flow of the alternative fuel through each of said at least one injectors using a control mechanism.

6. The method of claim 5, further comprising the step of distributing the alternative fuel to the selectively controlled at least one fuel injector using a fuel supply block.

7. An intake port adapter system for providing multipoint fuel delivery to an internal combustion engine the engine being a conventional engine having a fuel system that operates with a conventional fuel, the engine having a plurality of combustion chambers, each combustion chamber having an intake port, each intake port having a diameter, the system comprising:

a mixer plate associated with each intake port, each mixer plate providing an alternative fuel to each intake port, each mixer plate having a generally flat configuration adapted for placement along each intake port, and each mixer plate having an intake opening, the intake opening having a diameter corresponding to the diameter of the intake port; and a fuel receiving fitting associated with each mixer plate for providing fuel to each intake opening.

8. The system according to claim 7 further comprising a fuel metering device associated with each fuel receiving fitting, the fuel metering device for selectively introducing fuel to the corresponding intake opening.

9. The system according claim 8 further comprising a fuel delivery hose having a first end connected to the fuel metering device and having a second end connected to the fuel receiving fitting.

10. The system according to claim 7 further comprising:

a fuel metering valve assembly adapted to hold each fuel metering device, the valve assembly having a fuel connection for accepting alternative fuel from an alternative fuel supply and having a fuel supply block for supplying alternative fuel to each fuel metering device; and a control mechanism associated with the fuel metering valve assembly for selectively controlling the flow of fuel through each fuel metering device.

11. The system of claim 7, wherein the alternative fuel is a compressed natural gas fuel.

12. The system of claim 7, wherein the alternative fuel is liquid propane gas fuel.

13. The system of claim 10, further comprising a temperature sensor associated with the internal combustion engine, and wherein said control mechanism responds to sensed temperature of the internal combustion engine.

14. The system of claim 10, further comprising a pressure sensor associated with the infernal combustion engine, and wherein said control mechanism responds to sensed pressure of the internal combustion engine.

* * * * *